(12) United States Patent
Tsuchie

(10) Patent No.: US 10,171,986 B2
(45) Date of Patent: Jan. 1, 2019

(54) RADIO RELAY DEVICE AND SYSTEM WITH WAITING TIME OPTIMIZATION

(71) Applicant: Oki Electric Industry Co., Ltd., Tokyo (JP)

(72) Inventor: Kota Tsuchie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 68 days.

(21) Appl. No.: 15/403,503

(22) Filed: Jan. 11, 2017

(65) Prior Publication Data

US 2017/0245132 A1    Aug. 24, 2017

(30) Foreign Application Priority Data

Feb. 24, 2016   (JP) ................. 2016-033237

(51) Int. Cl.
*H04W 76/00*    (2018.01)
*H04W 8/00*    (2009.01)
(Continued)

(52) U.S. Cl.
CPC .......... *H04W 8/005* (2013.01); *H04B 17/318* (2015.01); *H04W 76/10* (2018.02);
(Continued)

(58) Field of Classification Search
CPC ..... H04W 84/18; H04W 40/22; H04W 8/005; H04W 48/12; H04W 40/005;
(Continued)

(56) References Cited

U.S. PATENT DOCUMENTS

2006/0293061 A1* 12/2006 Kobayashi ............. H04L 45/02
 455/455
2011/0063999 A1   3/2011 Erdmann et al.
(Continued)

FOREIGN PATENT DOCUMENTS

JP    2009-302694 A    12/2009
JP    2011-523830 A    8/2011

*Primary Examiner* — Sai Aung
(74) *Attorney, Agent, or Firm* — Rabin & Berdo, P.C.

(57) ABSTRACT

A radio communication system including a radio communication device configured to request connection, and radio relay devices. The communication device includes a neighbor node discovery unit to transmit a neighbor node discovery message, a selection unit to select the connection destination based on determination information when a response message to the discovery message is received, the determination information being used for determining whether to select a transmission source as the connection destination, and a storage unit to store the determination information. Each relay device includes a calculation processing unit to calculate, in accordance with a value of the determination information, transmission waiting time until transmission of the response message, a timer unit to manage passage of the waiting time, a response message transmission unit to transmit the response message when the timer unit notifies elapse of the waiting time, and a storage unit configured to store the determination information.

13 Claims, 8 Drawing Sheets

(51) Int. Cl.
*H04B 17/318* (2015.01)
*H04W 76/10* (2018.01)
*H04L 12/26* (2006.01)
*H04L 12/733* (2013.01)
*H04W 84/18* (2009.01)
*H04W 84/20* (2009.01)
*H04W 88/04* (2009.01)
*H04W 40/02* (2009.01)

(52) U.S. Cl.
CPC .......... *H04L 43/0864* (2013.01); *H04L 45/20* (2013.01); *H04W 40/02* (2013.01); *H04W 84/18* (2013.01); *H04W 84/20* (2013.01); *H04W 88/04* (2013.01)

(58) Field of Classification Search
CPC ... H04W 40/248; H04W 40/10; H04W 88/04; H04W 40/12; H04W 40/08; H04W 4/80; H04W 40/244
See application file for complete search history.

(56) References Cited

U.S. PATENT DOCUMENTS

2013/0246507 A1* 9/2013 Amemiya ........... H04L 67/2814
 709/203
2015/0120863 A1* 4/2015 Wu ........................ H04L 67/28
 709/217
2016/0269486 A1* 9/2016 Gupta ..................... H04L 67/12

* cited by examiner

1 RADIO COMMUNICATION SYSTEM

|     |        | TRANSMISSION WAITING TIME | | |
|-----|--------|-------|--------|------|
|     |        | SHORT | MEDIUM | LONG |
| RTT | SHORT  | 80%   | 20%    | 0%   |
|     | MEDIUM | 33%   | 34%    | 33%  |
|     | LONG   | 0%    | 20%    | 80%  |

RADIO RELAY DEVICE AND SYSTEM WITH WAITING TIME OPTIMIZATION

CROSS REFERENCE TO RELATED APPLICATION(S)

This application is based upon and claims benefit of priority from Japanese Patent Application No. 2016-033237, filed on Feb. 24, 2016, the entire contents of which are incorporated herein by reference.

BACKGROUND

The present invention relates to radio communication systems, radio communication devices, and radio relay devices. For example, the present invention can be applied to a radio communication system that decides a radio communication device serving as a parent to participate in a radio network.

In the case where each of radio communication devices (hereinafter, also referred to as "nodes") cannot directly communicate with a management device that manages the nodes in a radio network system including the nodes and the management device, the radio network system may adopt a multi-hop network in which instead of a node that cannot perform direct communication, another node relays the communication. Such a multi-hop network enables a node at a long distance to communicate with the management device.

In the case where a node (hereinafter, also referred to as "participation node") that newly participates in the multi-hop network cannot directly communicate with the management device when the participation node participates in (joins) the network, the participation node selects a node (hereinafter, also referred to as "parent node") that relays a network participation request message instead of the participation node, from among nodes that have already joined the network. In order to select such a parent node, the participation node broadcasts a neighbor node discovery message for discovering nodes (hereinafter, also referred to as "neighbor nodes") around the participation node.

A neighbor node that has received the message returns a response message to the participation node. At this time, if a transmission timing of the response message from the neighbor node is the same as another neighbor node, message collision happens and the participation node cannot receive the response message. Therefore, after receiving the message, the neighbor node waits for random time and then transmits the response message to avoid the collision.

There are various methods for selecting an optimum parent node. For example, one of the methods is to select a node having the highest received signal strength (RSSI value) of a received message. The participation node can decides the optimum parent node by collecting response messages from all neighbor nodes and selecting the parent node from among all the neighbor nodes. However, in order to collect the response messages from all the neighbor nodes, the participation node has to wait for maximum waiting time that may be selected in view of random waiting time for the response messages. Here, since more neighbor nodes results in higher probability of response message collision, it is necessary to limit the collision probability to a certain level or lower. Therefore, the maximum value of the random waiting time have to be set to be a little longer in view of the case of a large number of neighbor nodes.

As described above, since the participation node takes a lot of time to select the parent node, time it takes to join the network is unfortunately prolonged.

Technologies described in JP 2009-302694A and JP 2011-523830T are technologies of methods for selecting an optimum parent node in a multi-hop network. According to the technologies described in JP 2009-302694A and JP 2011-523830T, a participation node receives information on a neighbor node (the number of current child nodes, the number of hops to management device, round-trip time (RTT) to reach management device, and the like) from the neighbor node, and selects a neighbor node that seems to be optimum as a parent node.

In addition, according to JP 2011-523830T, each node calculates a packet loss rate or signal-to-noise ratio (SN ratio) from a communication history with neighbor nodes, and dynamically changes the optimum parent node in accordance with such information even after participated in the network.

SUMMARY

However, the technologies described in JP 2009-302694A and JP 2011-523830T are technologies related to indexes for selecting an optimum parent node. In order to select the optimum parent node, the technologies are premised on waiting for response messages from all neighbor nodes.

Therefore, the parent node selecting time is heavily dependent on random time to wait for messages transmitted from the neighbor nodes.

Accordingly, a radio communication system, radio communication device, and radio relay device that are capable of effectively deciding a radio relay device serving as a connection destination and quickly participating in a radio network have been desired.

From the above described point of view, there is provided a radio communication system including: a radio communication device configured to issue a network connection request; and a plurality of radio relay devices configured to relay the network connection request. The radio communication device includes (1-1) a neighbor node discovery unit configured to transmit, to a surrounding network, a neighbor node discovery message for discovering a radio relay device serving as a connection destination from among the plurality of radio relay devices, (1-2) a connection destination selection unit configured to select the radio relay device serving as the connection destination from among the plurality of radio relay devices on the basis of determination information when a response message to the neighbor node discovery message is received from each of the radio relay devices, the determination information being used for determining whether or not to select the radio relay device that is a transmission source of the response message, as the connection destination, and (1-3) a storage unit configured to store the determination information. Each of the radio relay devices includes (2-1) a transmission waiting time calculation processing unit configured to calculate short transmission waiting time that is waiting time until transmission of the response message in the case where the determination information is a good value, and calculate long transmission waiting time in the case where the determination information is a bad value, when the neighbor node discovery message is received from the radio communication device, (2-2) a first timer unit configured to manage passage of the transmission waiting time calculated by the transmission waiting time calculation processing unit, (2-3) a response message transmission unit configured to transmit the response message to the radio communication device when the first timer unit notifies that the transmission waiting time has elapsed, and (2-4) a storage unit configured to store the determination information.

From another point of view, there is provided a radio communication device in a radio communication system that includes the radio communication device configured to issue a network connection request, and a plurality of radio relay devices configured to relay the network connection request, the radio communication device including: (1) a neighbor node discovery unit configured to transmit, to a surrounding network, a neighbor node discovery message for discovering a radio relay device serving as a connection destination from among the plurality of radio relay devices; (2) a connection destination selection unit configured to select the radio relay device serving as the connection destination from among the plurality of radio relay devices on the basis of determination information when a response message to the neighbor node discovery message is received from each of the radio relay devices, the determination information being used for determining whether or not to select the radio relay device that is a transmission source of the response message, as the connection destination; and (3) a storage unit configured to store the determination information.

From another point of view, there is provided a radio relay device in a radio communication system that includes a radio communication device configured to issue a network connection request, and a plurality of the radio relay devices configured to relay the network connection request, the radio relay device including: (1) a transmission waiting time calculation processing unit configured to calculate short transmission waiting time that is waiting time until a response message to a neighbor node discovery message for discovering the radio relay device serving as the connection destination from among the plurality of radio relay devices is transmitted in the case where determination information used for determining whether or not to select the radio relay device as a connection destination is a good value, and calculate long transmission waiting time in the case where the determination information is a bad value, when the neighbor node discovery message is received from the radio communication device; (2) a first timer unit configured to manage passage of the transmission waiting time calculated by the transmission waiting time calculation processing unit; (3) a response message transmission unit configured to transmit the response message to the radio communication device when the first timer unit notifies that the transmission waiting time has elapsed; and (4) a storage unit configured to store the determination information.

According to the present invention, it is possible to effectively decide a radio relay device serving as a connection destination and quickly participate in a radio network.

DETAILED DESCRIPTION OF THE EMBODIMENT(S)

Figure 1:
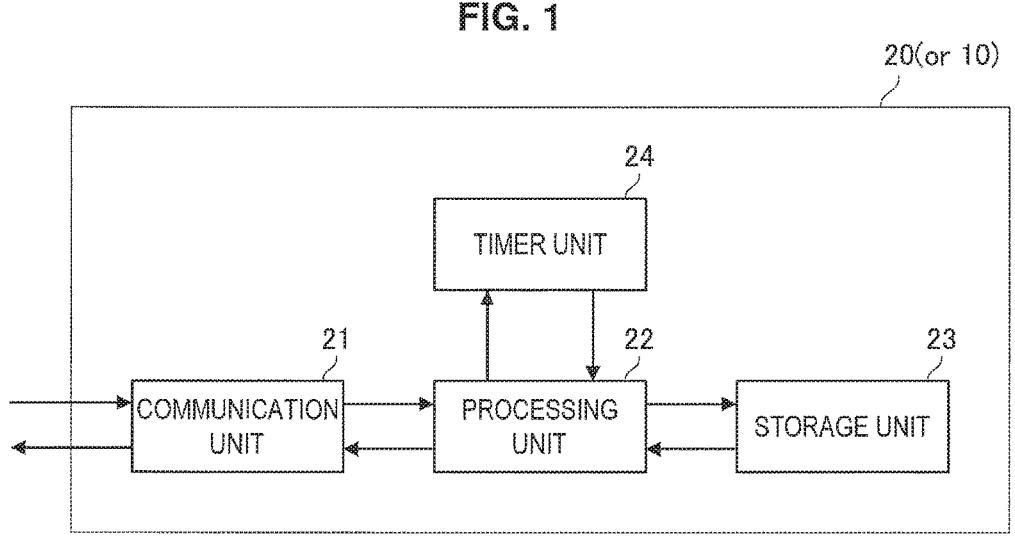
FIG. 1 is a block diagram illustrating a functional configuration of a radio communication device according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

Hereinafter, with reference to the drawings, the radio communication system, radio communication device, and radio relay device according a first embodiment of the present invention will be described in detail.

(A-1) Configuration According to First Embodiment

Figure 2:
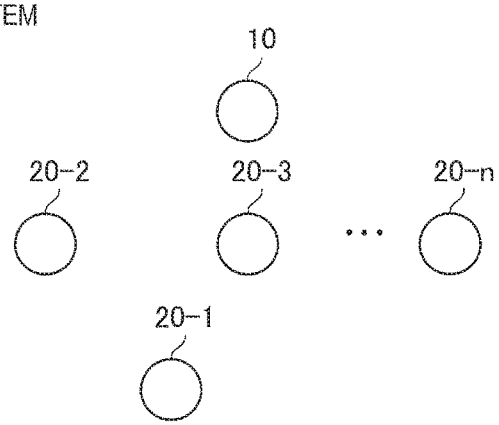
FIG. 2 is a block diagram illustrating an example of an overall configuration of a radio communication system according to the first embodiment.
Figure 3:
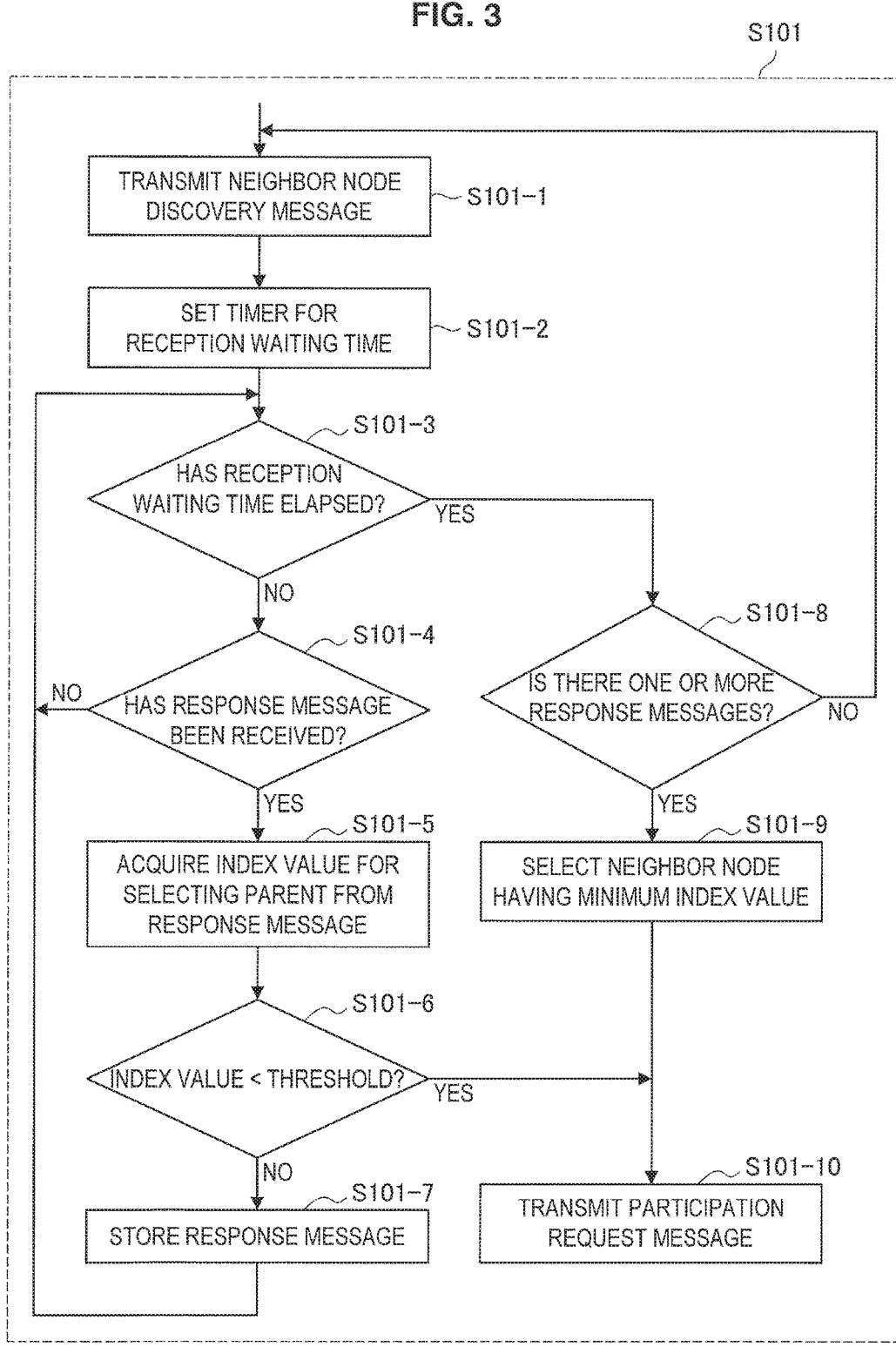
FIG. 3 is a flowchart illustrating operation of a radio communication device (participation node) according to the first embodiment.

FIG. 2 is a block diagram illustrating an overall configuration example of a radio communication system 1 according to the first embodiment.

First, a configuration of the radio communication system 1 will be described.

The radio communication system 1 includes a management device 10 and a plurality of radio communication devices 20 (20-1 to 20-n). The management device 10 manages the radio communication devices 20, and the plurality of radio communication devices 20 perform radio communication. Although the number of devices in the radio communication system 1 is not limited, it is assumed that the radio communication device 1 according to the embodiment includes one management device 10 and the plurality of radio communication devices 20 (20-1 to 20-n).

In addition, in the radio communication system 1, a multi-hop network is established by the management device 10 and nodes including the radio communication devices 20-1 to 20-n. Hereinafter, each of the radio communication devices 20 is referred to as the "node" constituting the multi-hop network. In addition, a node that intends to participate in the network of the radio communication system 1 is referred to as the "participation node", and a node that relays a participation request message from the participation node to the management device 10 is referred to as a "parent node". Communication methods (communication media) between devices (nodes) in the radio communication system 1 are not specifically limited. For example, various wireless LAN interface communication methods can be applied.

Next, features of the radio communication system 1 according to the embodiment will be described.

Unlike the related arts, the radio communication system 1 according to the embodiment can select an optimum parent node without waiting for all response messages from neighbor nodes, so that a participation node selects the optimum parent node. Specifically, the participation node that intends to participate in the network of the radio communication system 1 broadcasts a discovery message to a surrounding network (to neighbor nodes). Each of the neighbor nodes that have received the message (in other words, candidates for parent node) dynamically changes random transmission waiting time (transmission waiting time of a neighbor node that the participation node considers to be optimum as the parent node is stochastically set to be short) by using information (index value for selecting the parent such as RTT or the number of hops to management device 10) used by the participation node for determining whether a candidate for the parent is good or bad.

The participation node compares the index value for selecting the parent of a transmission source node (candidate node for parent) of the response message with a predetermined threshold. In accordance with a result of the comparison, the participation node selects the transmission source node as the parent node.

Therefore, the participation node has a high probability of receiving the response message from the candidate node for parent node that is optimum as the parent node. This results in quick selection of the parent node.

Next, an internal configuration of each of the radio communication devices 20 will be described.

FIG. 1 is a block diagram illustrating a functional configuration of the radio communication device. In FIG. 1, the radio communication device 20 includes a communication unit 21, a processing unit 22, a storage unit 23, and a timer unit 24.

For example, the radio communication device 20 may be constructed by installing programs (including a radio communication program and a radio relay program according to the embodiment) into a computer having a processor and memory. In addition, a part or all of the radio communication device 20 may be constructed by using hardware (for example, dedicated semiconductor chip, electrical circuit, and the like).

The communication unit 21 is a communication interface for accessing the multi-hop network. For example, the communication unit 21 includes a means for transmitting a message to the management device 10 or another radio communication device 20 when receiving a message transmission request from the processing unit 22 (to be described later). Alternatively, in the case where the communication unit 21 cannot directly transmit a message to a communication partner, the communication unit 21 transmits the message via another radio communication device 20. The communication unit 21 can adopt various routing methods as a relay method to another radio communication device 20. For example, the communication unit 21 can adopt routing methods such as Ad hoc On-Demand Distance Vector (AODV) Routing or IPv6 Routing Protocol for Low-Power and Lossy Networks (RPL).

In addition, the communication unit 21 includes a means for receiving a message transmitted from another radio communication device 20. In the case where the received message is destined for its own radio communication device 20, the communication unit 21 requests the processing unit 22 to process the received message. On the other hand, in the case where the received message is destined for the management device 10 or another radio communication device 20, the communication unit 21 transmits (relays) the message to the management device 10 or the another radio communication device 20 by using any of the routing methods described above.

The processing unit 22 generates a message (hereinafter, also referred to as "neighbor node discovery message") used by a radio communication device 20 (participation node) before joining the network for discovering neighbor radio communication devices 20 serving as the candidates for the parent, and requests the communication unit 21 to transmit the message. In addition, the processing unit 22 calculates waiting time for a response message to the neighbor node discovery message (hereinafter, also referred to as "maximum reception waiting time"), and requests the timer unit 24 (to be described later) to set a timer. For example, the maximum reception waiting time may be the maximum value of the random transmission waiting time for the response message.

In addition, the processing unit 22 includes a function of receiving the response message from the communication unit 21 and determining whether or not to select the transmission source node as the parent node from the index value for selecting the parent included in the response message. The processing unit 22 request the storage unit 23 (to be described later) to store the received response message. When the timer unit 24 notifies the processing unit 22 that the maximum reception waiting time has elapsed, the processing unit 22 acquires, from the storage unit 23, response messages received from neighbor nodes before the maximum reception waiting time has elapsed, and selects the optimum parent node from among transmission source nodes of the acquired response messages. For example, the method for selecting the optimum parent node is to select, as the parent node, a node having the best index value for selecting the parent among the nodes.

The processing unit 22 generates a participation request message to the selected parent node, and requests the communication unit 21 to transmit the message.

When the radio communication device 20 that has joined the network receives the neighbor node discovery message via the communication unit 21, the processing unit 22 calculates the random transmission waiting time for the response message by using the index value for selecting the parent, and requests the timer unit 24 to set a timer for the calculated time. When the processing unit 22 receives the notification from the timer unit 24 after a lapse of the transmission waiting time, the processing unit 22 generates a response message including the index value for selecting the parent, and requests the communication unit 21 to transmit the message.

The storage unit 23 stores the response message received in response to the request from the processing unit 22. When the storage unit 23 receives the request from the processing unit 22, the storage unit 23 takes out the stored response message, and provides the response message for the processing unit 22.

The storage unit 23 additionally stores information necessary for calculating the transmission waiting time for the response message from the index value for selecting the parent. For example, the information necessary for deciding the transmission waiting time may be a relational table between the index value for selecting the parent and transmission waiting time selected in the case of the value (relational table in FIG. 7 to be described later).

The timer unit 24 starts a timer for a requested time in response to the timer setting request from the processing unit 22. When the requested time has elapsed, the timer unit 24 notifies the processing unit 22 that the requested time has elapsed.

Next, an internal configuration of the management device 10 will be described. The management device 10 has structural elements similar to the radio communication device 20 illustrated in FIG. 1. However, the processing unit 22 of the management device 10 is different from the radio communication device 20. Therefore, the internal configuration of the management device 10 will be described while focusing on the difference from the radio communication device 20.

In addition to the functions of the processing unit 22 in the radio communication device 20, the processing unit 22 in the management device 10 has a function of generating a response message (participation approval message) to a participation request message when the participation request message is received from the participation node via the communication unit 21, and requesting the communication unit 21 to transmit the response message.

(A-2) Operation According to First Embodiment

Next, operation of the radio communication system 1 having the above described configuration according to the first embodiment will be described.

Hereinafter, with reference to FIG. 3 to FIG. 6, operation of respective devices from when a new radio communication device 20 (participation node) selects a node serving as a parent (parent node) from among neighbor nodes (candidate nodes for the parent of a node that has already joined the network) to when the new radio communication device 20 (participation node) participates in the multi-hop network will be described. Operation of the participation node is Step S101 in FIG. 3 (to be described later). Operation of the node that has already joined the network (candidate nodes for the parent) is Step S102 in FIG. 4 and Step S103 in FIG. 5 (to be described later). Operation of the management device 10 is Step S102 in FIG. 4 and Step S104 in FIG. 6.

Hereinafter, the "participation node" means any of radio communication devices 20 (20-1 to 20-n) before joining the network of the radio communication system 1. In addition, the neighbor node (node that has already joined the network) means any of radio communication devices 20 (20-1 to 20-n) that have already joined the network of the radio communication system 1 in an area in which the devices can receive data broadcast by the participation node.

[Step S101: Selection of Parent of Participation Node]

In order to discover neighbor nodes, the (processing unit 22 of the) participation node that newly participates in the network broadcasts the generated neighbor node discovery message via the communication unit 21 (S101-1). The neighbor node discovery message includes information on the participation node. For example, the information on the participation node is information indicating an address (MAC address) unique to the participation node, and information indicating an index value for selecting the parent. After transmitting the neighbor node discovery message, the processing unit 22 calculates the maximum reception waiting time that is time for waiting the response messages from the neighbor nodes. Subsequently, the processing unit requests the timer unit 24 to set a timer for the calculated maximum reception waiting time.

The timer unit 24 sets the timer for time (maximum reception waiting time) designated by the processing unit 22 (S101-2).

The timer unit 24 determines whether or not the timer for the set maximum reception waiting time has expired (S101-3). In the case where the set timer has expired, the timer unit 24 notifies the processing unit 22 of the expiration (process proceeds to Step S101-8 (to be described later)). On the other hand, in the case where the set timer has not expired, the timer unit 24 continues waiting (process proceeds to next Step S101-4).

The communication unit 21 determines whether or not the response message to the neighbor node discovery message has been received (S101-4). In the case where the response message has been received, the communication unit 21 requests the processing unit 22 to process the message (process proceeds to next Step S101-5). On the other hand, in the case where the response message has not been received, the communication unit 21 continues waiting for reception (process returns to Step S101-3 described above). Here, it is assumed that the received response message includes an index value for selecting the parent of a transmission source node, for example.

The processing unit 22 acquires, from the communication unit 21, information on the response message including the index value for selecting the parent of the transmission source node (S101-5).

The processing unit 22 determines whether or not to select the transmission source node as the parent node by using the acquired index value for selecting the parent of the transmission source node (S101-6). For example, the processing unit 22 determines whether or not to select the transmission source node as the parent node on the basis of whether the index value for selecting the parent is less than a preset threshold (or is the threshold or more). For example, in the case where the index value for selecting the parent is RTT, the processing unit 22 selects a transmission source node as the parent node when the RTT of the transmission source node is less than the preset threshold. In this case, it is expected that the RTT becomes longer as the number of hops to the management device 10 increases. Therefore, in the case where the participation node joins the network at a distant location from the management device 10, the number of hops to most neighbor nodes becomes large. Accordingly, it is highly possible that the RTT of the neighbor nodes exceeds the preset threshold. In other words, there is no neighbor node that satisfies the condition (determination by comparing with threshold). However, if the index value for selecting the parent is RTT per hop found by dividing RTT by the number of hops, the participation node can select the optimum parent node regardless of distance from the management device 10.

In the case where the index value for selecting the parent satisfies the comparison condition (less than threshold in example of FIG. 3) with the threshold, the process performed by the processing unit 22 proceeds to Step S101-10 (to be described later). In the case where the index value does not satisfy the comparison condition, the processing unit 22 performs a process in the next Step S101-7.

In the case where the index value for selecting the parent does not satisfy the comparison condition with the threshold (in the case where the node is not selected as the parent node), the processing unit 22 stores the response message in the storage unit 23 (S101-7). Subsequently, the processing unit 22 (communication unit 21) returns to the reception waiting state (process returns to Step S101-3 described above).

In the case where the timer unit 24 notifies the processing unit 22 that the timer set in the process of Step S101-3 described above has expired, the processing unit 22 requests acquisition of the response messages received before from the storage unit 23. Subsequently, the processing unit 22 determines whether or not the acquisition of the response messages from the storage unit 23 has succeeded (S101-8). In the case where the acquisition of the response messages has not succeeded, the processing unit 22 performs a process of transmitting the neighbor node discovery message again (process returns to Step S101-1 described above). On the other hand, in the case where the acquisition of the response messages has succeeded, the processing unit 22 performs a process in next Step S101-9.

The processing unit 22 selects the optimum parent node from among the acquired response messages (S101-9). For example, as the method for selecting the optimum parent node, the processing unit 22 selects a node having the shortest RTT per hop as the parent node.

Subsequently, the processing unit 22 generates a participation request message, and transmits the participation request message to the selected parent node via the communication unit (S101-10).

[Step S102: Operation Common to Management Device and Nodes that Have Already Joined Network]

When (the communication unit 21 of) the management device 10 or each of the nodes that have already joined the network receives some message from another radio communication device 20, (the communication unit 21 of) the management device 10 or each of the nodes requests the processing unit 22 to process the received message.

The processing unit 22 determines the type of the received message (S102-2). In the case where the type of the received message is the "participation request message", the process performed by the processing unit 22 proceeds to next Step S102-3. In the case where the type of the received message is the "participation approval message", the process performed by the processing unit 22 proceeds to Step S102-4 (to be described later). In the case where the type of the received message is the "neighbor node discovery message", the process performed by the processing unit 22 proceeds to Step S102-7 (to be described later).

In the case where the type of the received message is the "participation request message", the processing unit 22 determines whether or not its own device is the management device 10 (S102-3). In the case where the own device is the management device 10, the processing unit 22 performs Step [S104] to be described later. On the other hand, in the case where the own device is not the management device 10, the processing unit 22 performs Step [S103] to be described later.

In the case where the type of the received message is the "participation approval message" in Step S102-2 described above, the processing unit 22 determines whether or not it is possible to directly communicate with the participation node via the communication unit 21 (S102-4).

In the case where it has been determined that it is possible to directly communicate with the participation node in the process of Step S102-4 described above, the processing unit 21 transmits the participation approval message (S102-5). On the other hand, in the case where it has been determined that it is not possible to directly communicate with the participation node in the process of Step S102-4 described above, the processing unit 21 decides a next relay destination node and transmits the participation approval message to the next relay destination node by using some kind of routing method (S102-6).

In the case where the type of the received message is the "neighbor node discovery message" in the process of Step S102-2 described above, the processing unit 22 calculates transmission waiting time until transmission of the response message (S102-7). With regard to the method for calculating the transmission waiting time, the processing unit 22 calculates short transmission waiting time in the case where an index value is good on the basis of the index value for selecting the parent, and the processing unit 22 calculates long transmission waiting time in the case where the index value is bad. For example, the processing unit 22 uses the RTT per hop as the index value used for calculating the transmission waiting time.

Figures 7, 8:
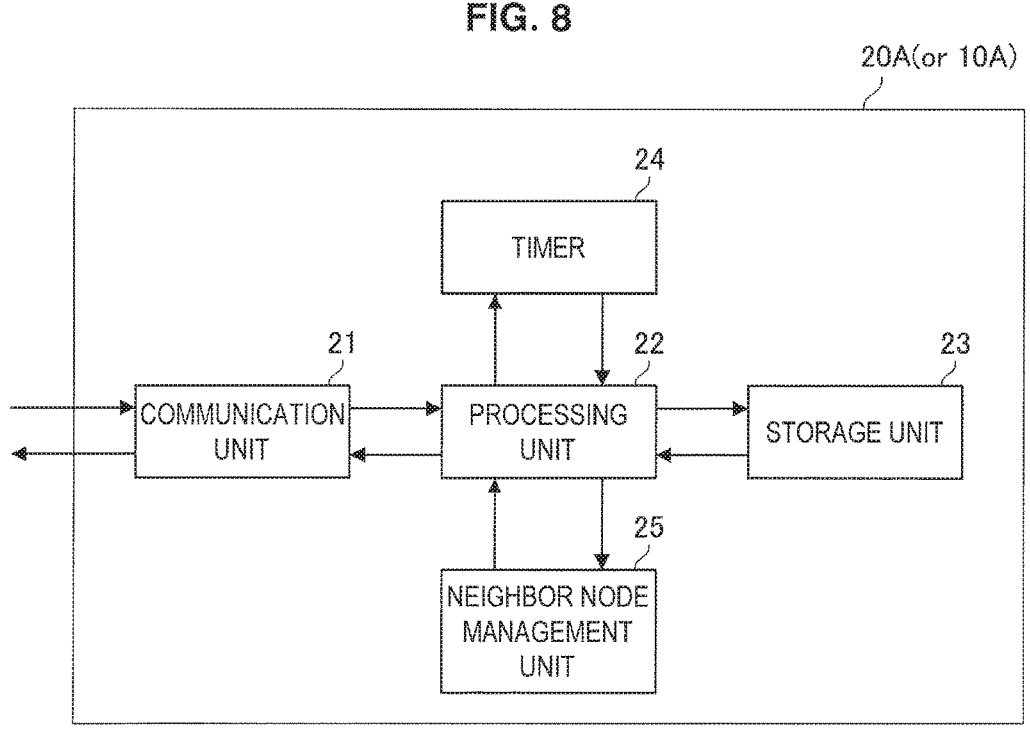
FIG. 7 is an explanatory diagram illustrating a relation between RTT per hop and transmission waiting time according to the first embodiment.
FIG. 8 is a block diagram illustrating a functional configuration of a radio communication device according to a second embodiment.

FIG. 7 is an explanatory diagram illustrating a relation between the RTT per hop and the transmission waiting time.

The processing unit 22 stochastically selects transmission waiting time in accordance with the relational table in FIG. 7. The item "RTT" in FIG. 7 indicates RTT per hop by three levels including "short", "medium", and "long". For example, with regard to RTT belonging to any of "short", "medium", and "long", when a measured RTT value is in a predetermined range of each item, the RTT is considered to belong to the item (any of "short", "medium", and "long") (for example, in the case where the range of "short" is determined to be 350 milliseconds or less, the RTT is considered to be "short" when a measured value of the RTT is 325 milliseconds). In addition, in FIG. 7, the item "transmission waiting time" indicates random transmission waiting time for avoiding message collision, and the "transmission waiting time" is indicated by three levels including "short", "medium", and "long". For example, the item "transmission waiting time" indicates that probability of selection of "short" transmission waiting time is 80%, probability of selection of "medium" transmission waiting time is 20%, and probability of selection of "long" transmission waiting time is 0%, in the case where the RTT belongs to the "short" item. In other words, shorter transmission waiting time is selected with higher probability, as RTT becomes shorter. The probability in FIG. 7 is a mere example, and various values can be used.

However, in the example of FIG. 7, even in the case where the RTT belongs to the item "short", the probability of selection of "short" transmission waiting time is not 100%. For example, in the case where neighbor nodes are concentrated around the management device 10 and RTT of all the neighbor nodes are "short", it is highly possible that response message collision occurs since all the neighbor nodes have short transmission waiting time. Therefore, as illustrated in FIG. 7, it is possible to reduce the probability of message collision by including the probability of selection of "medium" transmission waiting time even in the case where the RTT is "short".

The processing unit 22 requests to set a timer for the calculated transmission waiting time. Subsequently, the timer unit 24 sets the timer for the time designated by the processing unit 22 (S102-8).

The timer unit 24 determines whether or not the timer for the set transmission waiting time has expired (S102-9). In the case where the set timer has expired, the timer unit 24 notifies the processing unit 22 of the expiration (process proceeds to Step S1002-10 (to be described later)). On the other hand, in the case where the set timer has not expired, the timer unit 24 continues waiting.

When the processing unit 22 receives the notification of the expiration from the timer unit 24, the processing unit 22 generates a response message including the index value for selecting the parent, and transmits the response message to the participation node via the communication unit 21(S102-10).

[Step S103: Operation of Node that has Already Joined Network at Time of Receiving Participation Request Message]

The node that has already joined the network determines whether or not it is possible to directly communicate with the management device 10 via the communication unit 21 (S103-1).

In the case where it has been determined that it is possible to directly communicate with the management device 10 in the process of Step S103-1 described above, the communication unit 21 transmits the participation request message to the management device 10 (S103-2).

On the other hand, in the case where it has been determined that it is not possible to directly communicate with the management device 10 in the process of Step S103-1 described above, the communication unit 21 decides a next relay destination node and transmits the participation request message to the next relay destination node by using some kind of routing method (S103-3).

[Step S104: Operation of Management Device at Time of Receiving Participation Request Message]

When the management device 10 (processing unit 22) receives the participation request message via the communication unit 21, the management device 10 generates the participation approval message to a transmission source node (participation node) of the participation request message (S104-1).

The processing unit 22 determines whether or not it is possible to directly communicate with the participation node via the communication unit 21 (S104-2).

In the case where it has been determined that it is possible to directly communicate with the participation node in the process of Step S104-2 described above, the communication unit 21 transmits the participation approval message to the participation node (S104-3).

On the other hand, in the case where it has been determined that it is not possible to directly communicate with the participation node in the process of Step S104-2 described above, the communication unit 21 decides a next relay destination node and transmits the participation approval message to the next relay destination node by using some kind of routing method (S104-4).

(A-3) Effect According to First Embodiment

The following effects can be achieved according to the first embodiment.

As the transmission waiting time for the response message to the neighbor node discovery message from the participation node, the radio communication device 20 serving as the neighbor node uses the index value for selecting the parent and selects short transmission waiting time when the index value is good, and selects long transmission waiting time when the index value is bad. In addition, the radio communication device 20 serving as the participation node compares the index value for selecting the parent included in the response message with a preset threshold to determine whether or not to select the transmission source node as the parent node. By using such a method for selecting a parent node, the radio communication device 20 serving as the participation node can receive the response message faster from a neighbor node having the good index value for selecting the parent than a neighbor node having the bad index value for selecting the parent. This enables selection of the parent node without waiting for response messages from all the neighbor node.

In addition, the radio communication device 20 serving as the participation node determines whether to select the transmission source node as the parent node by comparing the index value for selecting the parent of the transmission source node of the response message with a preset threshold. Therefore, it is possible to select the optimum parent node even in the case of first receiving a response message from a node that is not suitable for the parent node. For example, even in the case where the node having the bad index value for selecting the parent happens to select transmission waiting time shorter than the node having the good index value for selecting the parent, the participation node can select only a neighbor node optimum as the parent node as the parent node since the node having the bad index value is not selected as the parent node.

In addition, there is a probability that the radio communication device 20 serving as the neighbor node selects long (short) waiting time as the transmission waiting time for the response message even in the case where the index value for selecting the parent is good (bad). By using such a selection method, it is possible to avoid collision of response messages even in the case where nodes are concentrated in a network.

In addition, as the index for selecting a parent, the radio communication device 20 according to the embodiment uses an index (for example, RTT per hop) that does not depend on distance (the number of hops) from the management device 10. By using such an index, the radio communication device 20 serving as the participation node can quickly select the optimum parent node regardless of the place where the device is present.

(B) Second Embodiment

Next, with reference to the drawings, a radio communication system, radio communication device, radio relay device according a second embodiment of the present invention will be described. The second embodiment is different from the first embodiment in that a radio communication device calculates transmission waiting time for a response message to a neighbor node discovery message also in view of the number of neighbor nodes. In the radio network, probability of response message collision increases as the number of neighbor nodes increases (conversely, the probability decreases as the number of neighbor nodes decreases). According to the first embodiment, a radio communication device (node that has received neighbor node discovery message) has a low probability of selecting long transmission waiting time even in the case of good index value, in order to prevent collision of response messages from nodes having similar index values for selecting the parent. However, in the case where the number of neighbor nodes is small, probability of response message collision is low even if only short transmission waiting time is selected. Therefore, according to the second embodiment, the radio communication device dynamically selects transmission waiting time on the basis of the number of neighbor nodes in a manner that the radio communication device dynamically selects transmission waiting time in view of the collision in the case where the number of neighbor nodes are large, and the radio communication device dynamically selects transmission waiting time regardless of the collision in the case where the number of neighbor nodes are small.

(B-1) Configuration According to Second Embodiment

FIG. 2 also illustrates a configuration of a radio communication system 1 according to the second embodiment in a way similar to the first embodiment.

Hereinafter, configurations of each of radio communication devices 20A and a management device 10A according to the second embodiment will be described while focusing on difference from the first embodiment.

FIG. 8 is a block diagram illustrating a functional configuration of the radio communication device and the management device. In FIG. 8, a neighbor node management unit 25 is newly added to the structural elements described above with reference to FIG. 1.

The neighbor node management unit 25 stores and manages information on neighbor nodes around a node that has already joined the network. The information on neighbor nodes can be obtained (or calculated) from messages transmitted and received during operation of the network. For example, the information may include network addresses of the neighbor nodes, the number of hops from the management device 10, a message loss rate between the neighbor nodes, and the like. The messages transmitted and received during operation of the network may be application data messages, or messages that respective nodes periodically exchanges with neighbor nodes in order to maintain routing topology or to perform alive monitoring on the nodes, for example. When the processing unit 22 issues a request, the neighbor node management unit 25 returns the stored information on the neighbor nodes.

In addition to the functions of the processing unit 22 according to the first embodiment, the processing unit 22 has a means for acquiring neighbor node information from the neighbor node management unit 25 when calculating transmission waiting time for a response message to a neighbor node discovery message.

In addition, the processing unit 22 calculates the transmission waiting time from the neighbor node information and the index value for selecting the parent. For example, as the method for calculating transmission waiting time, the processing unit 22 prepares a plurality of relational tables (FIG. 9) between index values (RTT) for selecting the parent and waiting time to be selected as illustrated in FIG. 7, and calculates the transmission waiting time with reference to an appropriate relational table according to the number of nodes.

Figure 9:
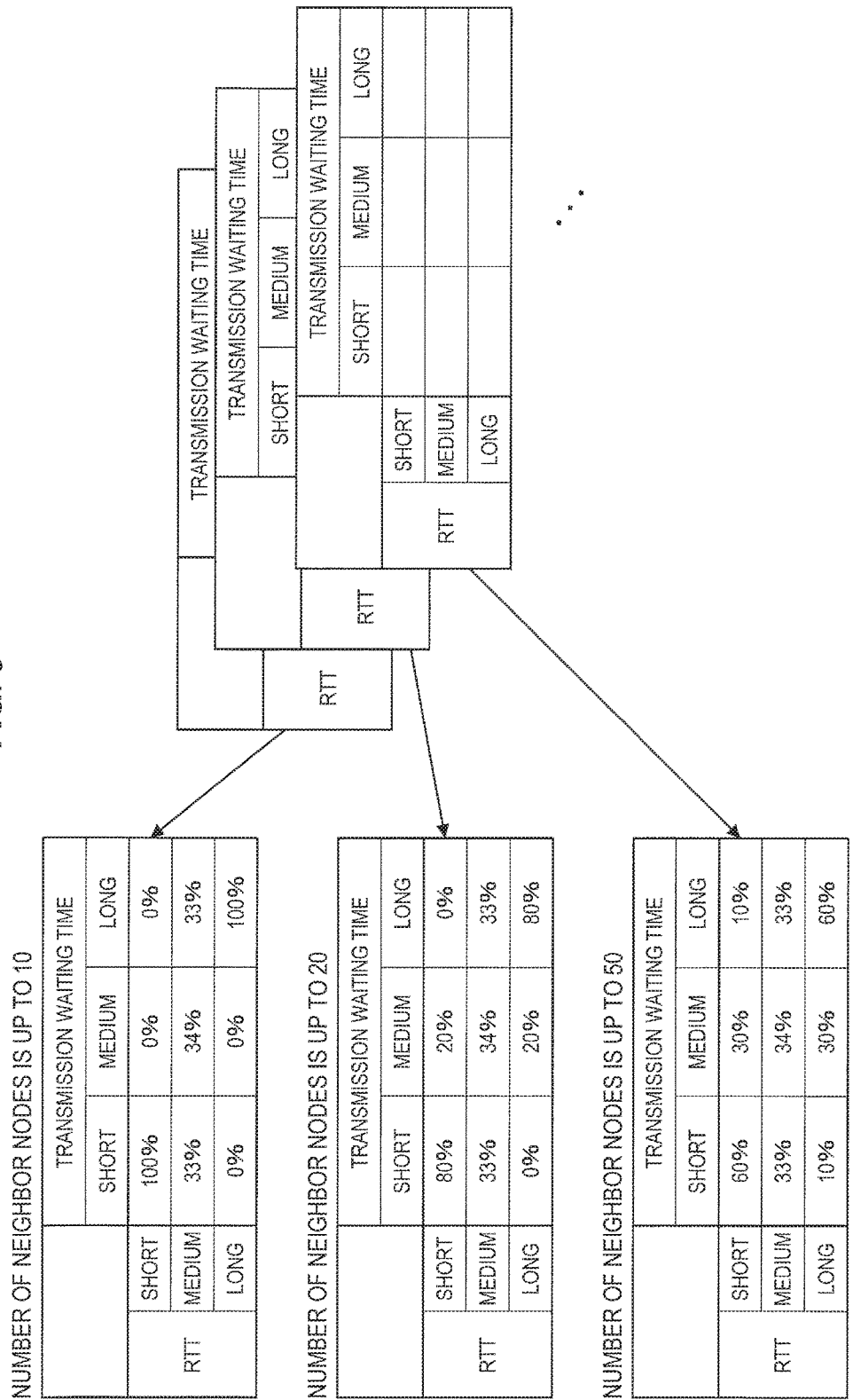
FIG. 9 is an explanatory diagram illustrating selection of an appropriate relational table from a plurality of relational tables (FIG. 7) according to the second embodiment.

FIG. 9 is an explanatory diagram illustrating selection of an appropriate relational table from the plurality of relational tables. In FIG. 9, the range of transmission waiting time to be selected is expanded as the number of neighbor nodes increases (10→20→50). For example, with reference to a relational table of 10 neighbor nodes, only "short" transmission waiting time can be selected (in 100%) when RTT is "short". However, with reference to a relational table of 50 neighbor nodes, probability of selection of "short" transmission waiting time is 60%, probability of selection of "medium" transmission waiting time is 30%, and probability of selection of "long" transmission waiting time is 10% even when RTT is "short". That is, the range of selection is expanded.

(B-2) Operation According to Second Embodiment

Next, operation of the radio communication system 1 having the above described configuration according to the second embodiment will be described with reference to the drawings. Hereinafter, operation of the radio communication device 20A according to the second embodiment will be described while focusing on difference from the first embodiment.

Figure 4:
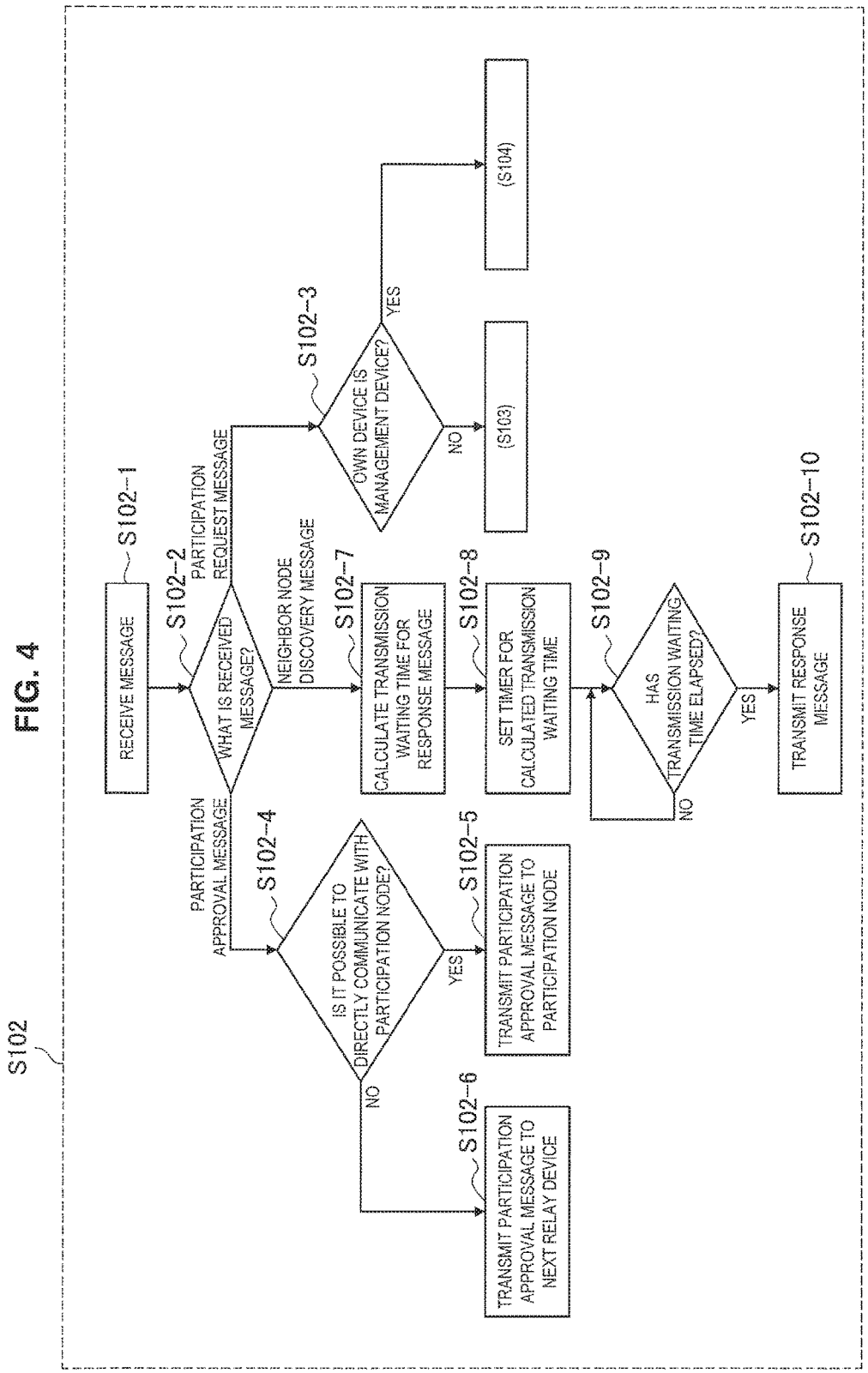
FIG. 4 is a flowchart illustrating operation of a radio communication device (node that has already joined a network) and a management device according to the first embodiment.
Figure 5:
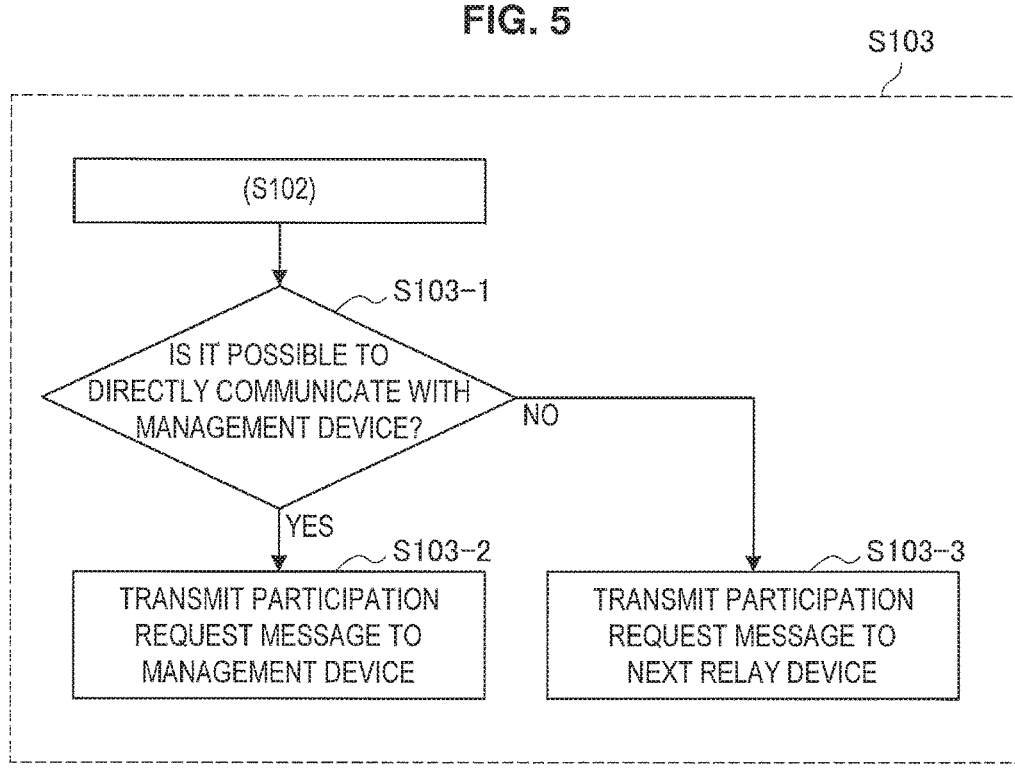
FIG. 5 is a flowchart illustrating operation unique to a radio communication device (node that has already joined a network) according to the first embodiment.
Figure 6:
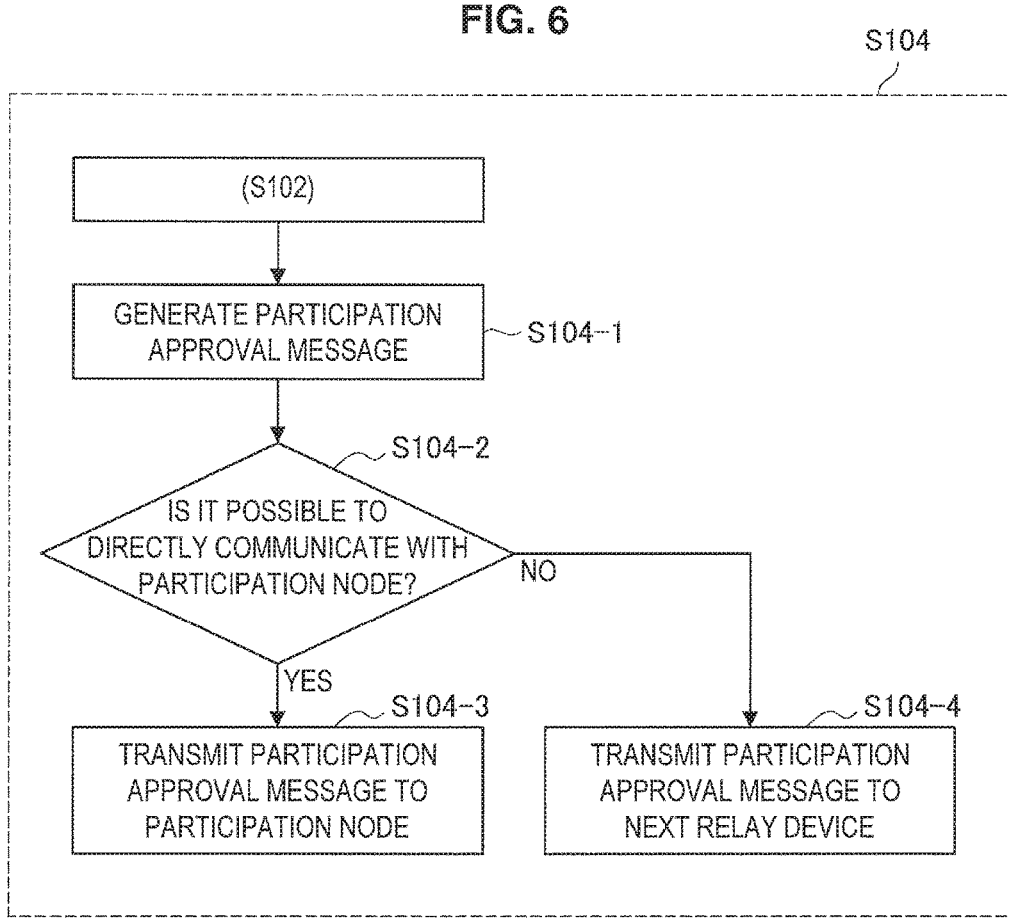
FIG. 6 is a flowchart illustrating operation unique to a management device according to the first embodiment.
Figure 10:
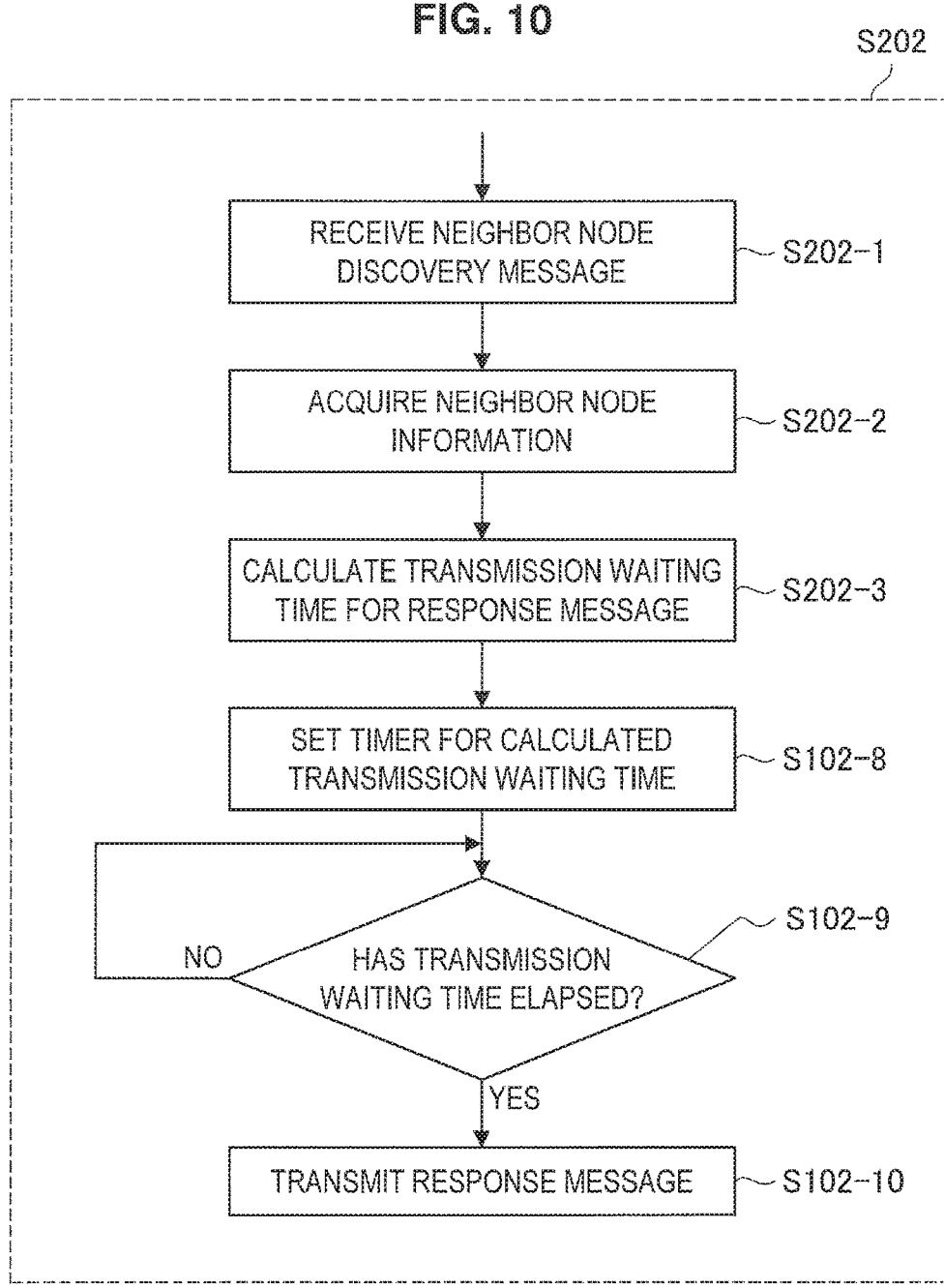
FIG. 10 is a flowchart illustrating operation of a radio communication device (node that has already joined a network) according to the second embodiment.

FIG. 10 is an explanatory diagram illustrating operation of a radio communication device according to the second embodiment at the time of receiving a neighbor node discovery message. The steps having the same reference numerals in FIG. 10 and FIG. 4 are the same process. Therefore, repeated explanation will be omitted. Hereinafter, operation (Step S202) in the case where nodes (20 neighbor nodes) that have already joined a network have received the neighbor node discovery message will be described.

[Step S202: Operation of Nodes that have Already Joined Network at Time of Receiving Neighbor Node Discovery Message]

When the neighbor node discovery message is received, the communication unit 21 requests the processing unit 22 to process the message (S202-1).

The processing unit 22 requests neighbor node information from the neighbor node management unit 25, and acquires the neighbor node information from the neighbor node management unit 25 (S202-2). The processing unit 22 recognizes that the number of neighbor nodes is 20 from the acquired neighbor node information, and requests, from the storage unit 23, a relational table of transmission waiting time for response messages in the case of the 20 neighbor nodes. For example, in the case where the relational table is the relational table in FIG. 9, the storage unit 23 returns the relational table of 20 neighbor nodes in FIG. 9 to the processing unit 22.

In a way similar to Step S102-7 described above, the processing unit 22 calculates the transmission waiting time on the basis of the acquired relational table and the index value for selecting the parent (S202-3).

Note that, subsequent operation (S102-8 to S102-9) has already been described above, and the repeated explanation will be omitted.

(B-3) Effect According to Second Embodiment

In addition to the effect according to the first embodiment, the second embodiment can achieve the following effects.

When calculating the transmission waiting time for the response message to the neighbor node discovery message, the processing unit 22 according to the second embodiment calculates the transmission waiting time in view of information on neighbor nodes around itself (the number of neighbor nodes). According to such a method, the processing unit 22 can calculates appropriate transmission waiting time in accordance with the number of neighbor nodes.

For example, in the case where the number of neighbor nodes is small, it is only necessary for a node (radio communication device 20A) having a good index value for selecting the parent to return a response message as quickly as possible regardless of the collision. On the other hand, in the case where the number of neighbor nodes is large, the processing unit 22 calculates the transmission waiting time in view of collision of response messages. In the case where the collision occurs and the participation node can receive no response message during waiting for reception, the participation node transmits the neighbor node discovery message again (in other words, time for selecting parent becomes longer than maximum reception waiting time of participation node). Therefore, in the case where the number of neighbor nodes is large, the processing unit 22 performs calculation in a manner that probability of selecting long transmission waiting time becomes low even in the case of the node having the good index value for selecting the parent in order to surely deliver the response message to the participation node. This results in optimization of the time for selecting the parent.

(C) Another Embodiment

The present invention is not limited to the above described embodiments. The present invention can be applied to a modified embodiment exemplified as follows.

(C-1) The example in which RTT per hop is used as the index value for selecting the parent has been described in the first embodiment. However, the present invention is not limited thereto. For example, the radio communication device 20 (processing unit 22) may use a success rate of communication between a neighbor node and the management device 10, as the index (probability of transmitting a message to a communication partner without retransmission and receiving a response without retransmission).

Alternatively, as the index, the processing unit 22 may use a (worst value or) average value of average ((transmitted RSSI value+received RSSI value)/2) of RSSI values of transmission and reception in respective links between the neighbor node and the management device 10. For example, in the case where there is two nodes between the neighbor node and the management device 10 (in other words, the number of links is three) and RSSI values of transmission and reception in the respective links are −75 dBm, −80 dBm, and −65 dBm, the index is −73 dBm when the average value is used as the index, and the index is −80 dBm when the worst value is used as the index. By using such an index, the participation node (processing unit 22) can select a node capable of transmitting a participation request message to the management device 10 more accurately, as the parent node.

(C-2) According to the first embodiment, the participation node (processing unit 22) finds the maximum transmission waiting time for the response message to the neighbor node discovery message as the maximum value of the transmission waiting time for the response message. However, the present invention is not limited thereto. For example, the processing unit 22 may set the maximum transmission waiting time for the response message to be the maximum value of the transmission waiting time that may be selected by a node having a good index value for selecting the parent. For example, in FIG. 7, the node whose RTT is "short" selects "medium" transmission waiting time at a maximum. Accordingly, the processing unit 22 sets the "medium" transmission waiting time as the maximum reception waiting time for the response message.

In addition, the maximum reception waiting time may be dynamically changed with reference to an index value for selecting the parent of a response message received first. In addition to the index value (RTT in first embodiment) for selecting the parent of the response message, the participation node (processing unit 22) also have a relational table (FIG. 7) for operation after joining the network. For example, in the case where the participation node first receives a response message of a node whose RTT is "long", the participation node can uses such information and determine that there is a probability that the response message has been transmitted while the "medium" transmission waiting time has been selected from the relational table even in the case where the RTT is "long". In addition, the participation node can also determine that a response message has been transmitted from a node whose RTT is "short" while selecting "medium" as the longest transmission waiting time. As described above, the participation node can determine that, until time of the maximum value of the "medium" transmission waiting time, the response message is transmitted from a node (node having short RTT) better than a node from which the participation node first receives a response message, if there is the node better than the node from which the participation node first receives the response message. Therefore, it is possible to set the maximum value of the "medium" transmission waiting time (accurately, value obtained by subtracting time elapsed after transmission of neighbor node discovery message from the maximum value of "medium" transmission waiting time) as the maximum reception waiting time.

(C-3) In the above described embodiments, the case in which a participation node selects a parent node for joining the radio communication system 1 from among nodes that have already joined the network has been used as an example. However, the present invention is not limited thereto. For example, the present invention can also be applied to the case where the node that has already joined the network cannot directly communicate with the management device 10 and an alternate node for relaying the communication is selected from among the other nodes that have already joined the network instead.

(C-4) In the embodiments described above, it is assumed that the radio communication system 1 includes one management device 10. However, the present invention is not limited thereto. For example, the present invention can be applied to a radio network system in which there is no management device 10 and one or a plurality of predetermined radio communication devices 20 allow connection from another radio communication device 20.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A radio communication system, comprising:
    a radio communication device configured to issue a network connection request; and
    a plurality of radio relay devices configured to relay the network connection request,
    wherein the radio communication device includes
        a first processor; and
        a first non-transitory storage medium containing first program instructions sored thereon, execution of which by the first processor causes the radio communication device to provide functions of:
            a neighbor node discovery unit configured to transmit, to a surrounding network, a neighbor node discovery message for discovering a radio relay device serving as a connection destination from among the plurality of radio relay devices,
            a connection destination selection unit configured to select the radio relay device serving as the connection destination from among the plurality of radio relay devices on the basis of determination information when a response message to the neighbor node discovery message is received from each of the radio relay devices, the determination information being used for determining whether or not to select the radio relay device that is a transmission source of the response message, as the connection destination, and
a storage unit configured to store the determination information, and wherein each of the radio relay devices includes
a second processor; and
a second non-transitory storage medium containing second program instructions stored thereon, execution of which by the second processor causes said each radio relay device to provide function of:
a transmission waiting time calculation processing unit configured to calculate, in accordance with a value of the determination information, transmission waiting time that is waiting time until transmission of the response message when the neighbor node discovery message is received from the radio communication device, the transmission waiting time calculation processing unit calculating a shorter transmission waiting time with a higher probability, as the value of the determination information indicates better communication environment;
a first timer unit configured to manage passage of the transmission waiting time calculated by the transmission waiting time calculation processing unit,
a response message transmission unit configured to transmit the response message to the radio communication device when the first timer unit notifies that the transmission waiting time has elapsed, and
a storage unit configured to store the determination information.

2. The radio communication system according to claim 1, wherein the determination information is round-trip time per hop between the radio relay device that is the transmission source of the response message and a radio approval device that is set in advance from among the plurality of radio relay devices and that approves the network connection request, and
wherein the connection destination selection unit selects the radio relay device that is the transmission source of the response message as the connection destination in a case where the value of the determination information corresponding to the radio relay device that is the transmission source of the response message is less than a predetermined threshold.

3. The radio communication system according to claim 1, wherein the determination information is a success rate of communication between the radio relay device that is the transmission source of the response message and a radio approval device that is set in advance from among the plurality of radio relay devices and that approves the network connection request, and
wherein the connection destination selection unit selects the radio relay device that is the transmission source of the response message as the connection destination in a case where the value of the determination information corresponding to the radio relay device that is the transmission source of the response message is a predetermined threshold or more.

4. The radio communication system according to claim 1, wherein the determination information is an average value of RSSI values of transmission and reception in respective links between the radio relay device that is the transmission source of the response message and a radio approval device that is set in advance from among the plurality of radio relay devices and that approves the network connection request, and
wherein the connection destination selection unit selects the radio relay device that is the transmission source of the response message as the connection destination in a case where the value of the determination information corresponding to the radio relay device that is the transmission source of the response message is a predetermined threshold or more.

5. The radio communication system according to claim 1, wherein the determination information is a minimum value among RSSI values of transmission and reception in respective links between the radio relay device that is the transmission source of the response message and a radio approval device that is set in advance from among the plurality of radio relay devices and that approves the network connection request, and
wherein the connection destination selection unit selects the radio relay device that is the transmission source of the response message as the connection destination in a case where the value of the determination information corresponding to the radio relay device that is the transmission source of the response message is a predetermined threshold or more.

6. The radio communication system according to claim 1, wherein the radio communication device further includes
a maximum reception waiting time calculation processing unit configured to calculate maximum reception waiting time that is maximum time for waiting the response message from each of the radio relay devices to the neighbor node discovery message, and
a second timer unit configured to manage passage of the maximum reception waiting time calculated by the maximum reception waiting time calculation processing unit, and
wherein the connection destination selection unit selects a radio relay device serving as the connection destination from among transmission sources of the response messages received during the maximum reception waiting time, in a case where the radio relay device serving as the connection has not been selected when the second timer unit notifies that the maximum reception waiting time has elapsed.

7. The radio communication system according to claim 6, wherein the maximum reception waiting time is a maximum value that is possibly selected as the transmission waiting time for the response message.

8. The radio communication system according to claim 6, wherein the maximum reception waiting time is a maximum value of the transmission waiting time for the response message, the maximum value being possibly selected by the radio relay device having a good value of the determination information.

9. The radio communication system according to claim 6, wherein, on the basis of the value of the determination information of the radio rely device that is a transmission source of the response message received first, the maximum reception waiting time calculation processing unit calculates a maximum value of the transmission waiting time for the response message as the maximum reception waiting time, the maximum value being possibly selected by the radio relay device having a better value of the determination information.

10. The radio communication system according to claim 1, wherein each of the radio relay devices further includes a neighbor node management unit configured to manage the number of neighbor nodes around each of the radio relay devices.

11. The radio communication system according to claim 10,
wherein the transmission waiting time calculation processing unit calculates the transmission waiting time in accordance with the number of neighbor nodes acquired by the neighbor node management unit.

12. A radio relay device in a radio communication system that includes
a radio communication device configured to issue a network connection request, and
a plurality of the radio relay devices, including the radio relay device, configured to relay the network connection request,
the radio relay device comprising:
a processor; and
a non-transitory storage medium containing program instructions stored thereon, execution of which by the processor causes the radio relay device to provide function of:
a transmission waiting time calculation processing unit configured to calculate, in accordance with determination information used for determining whether or not to select the radio relay device as a connection destination, transmission waiting time that is waiting time until a response message to a neighbor node discovery message for discovering the radio relay device serving as the connection destination from among the plurality of radio relay devices is transmitted when the neighbor node discovery message is received from the radio communication device, the transmission waiting time calculation processing unit calculating a shorter transmission waiting time with a higher probability, as a value of the determination information indicates better communication environment;
a first timer unit configured to manage passage of the transmission waiting time calculated by the transmission waiting time calculation processing unit;
a response message transmission unit configured to transmit the response message to the radio communication device when the first timer unit notifies that the transmission waiting time has elapsed; and
a storage unit configured to store the determination information.

13. A radio communication system, comprising:
a radio communication device configured to issue a network connection request; and
a plurality of radio relay devices configured to relay the network connection request,
wherein the radio communication device includes
a first processor; and
a first non-transitory storage medium containing first program instructions sored thereon, execution of which by the first processor causes the radio communication device to provide functions of:
a neighbor node discovery unit configured to transmit, to a surrounding network, a neighbor node discovery message for discovering a radio relay device serving as a connection destination from among the plurality of radio relay devices,
a connection destination selection unit configured to select the radio relay device serving as the connection destination from among the plurality of radio relay devices on the basis of determination information when a response message to the neighbor node discovery message is received from each of the radio relay devices, the determination information being used for determining whether or not to select the radio relay device that is a transmission source of the response message, as the connection destination, and
a storage unit configured to store the determination information,
wherein the determination information is round-trip time per hop between the radio relay device that is the transmission source of the response message and a radio approval device that is set in advance from among the plurality of radio relay devices and that approves the network connection request, and
wherein the connection destination selection unit selects the radio relay device that is the transmission source of the response message as the connection destination in a case where a value of the determination information corresponding to the radio relay device that is the transmission source of the response message is less than a predetermined threshold;
wherein each of the radio relay devices includes
a second processor; and
a second non-transitory storage medium containing second program instructions stored thereon, execution of which by the second processor causes said each radio relay device to provide function of:
a transmission waiting time calculation processing unit configured to calculate, in accordance with the value of the determination information, transmission waiting time that is waiting time until transmission of the response message when the neighbor node discovery message is received from the radio communication device,
a first timer unit configured to manage passage of the transmission waiting time calculated by the transmission waiting time calculation processing unit,
a response message transmission unit configured to transmit the response message to the radio communication device when the first timer unit notifies that the transmission waiting time has elapsed, and
a storage unit configured to store the determination information.

* * * * *